United States Patent [19]

Beery

[11] Patent Number: 4,928,900
[45] Date of Patent: May 29, 1990

[54] ENCODED CARTRIDGE

[75] Inventor: Jack Beery, Centerville, Ohio

[73] Assignee: The Mead Corporation, Dayton, Ohio

[21] Appl. No.: 274,872

[22] Filed: Nov. 21, 1988

[51] Int. Cl.$^5$ .................. B65M 19/00; G03B 17/26
[52] U.S. Cl. .......................... 242/71.1; 242/55.53; 242/71; 352/78 C; 354/21
[58] Field of Search ............ 242/71, 71.1, 197, 55.53; 354/21, 275; 352/78 C

[56] References Cited

U.S. PATENT DOCUMENTS

| | | | |
|---|---|---|---|
| 3,485,157 | 12/1969 | Nerwin | 352/78 C |
| 3,490,348 | 1/1970 | Ariyasu et al. | 352/78 C X |
| 3,666,361 | 5/1972 | Pankow et al. | 352/78 C |
| 3,700,316 | 10/1972 | Kurechi | 352/78 C |
| 4,558,935 | 12/1985 | Ishizaka et al. | 354/21 |
| 4,743,984 | 5/1988 | Ryan . | |

Primary Examiner—Stuart S. Levy
Assistant Examiner—Steven M. duBois
Attorney, Agent, or Firm—Biebel, French & Nauman

[57] ABSTRACT

A cartirdge or cassette for containing light-sensitive web material for application to utilization apparatus is provided with mechanical encoding on one of the cartridge end caps, in the form of a series of protrusions and/or recesses. The protrusions or recesses are formed by injection molding in one of the exposed walls of the end cap and provide a binary code which, in cooperation with utilization apparatus, prevents the improper insertion and utilization of the cartridge. The code positions are formed during set-up of the mold in which the end cap is formed by injection molding by the selection of cooperation pairs of mold pins in recesses provided in the mold halves, to form either a recess or a protrusion in the form of a pin in each of four possible code positions. The protrusions have closed ends and are hollow, so that the breaking off of a protrusion by attempted improper utilization permits light to enter the interior of the cartridge through the protrusion and end cap.

1 Claim, 2 Drawing Sheets

FIG-4
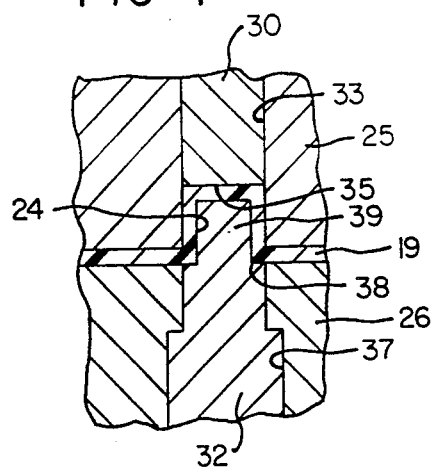
FIG-5
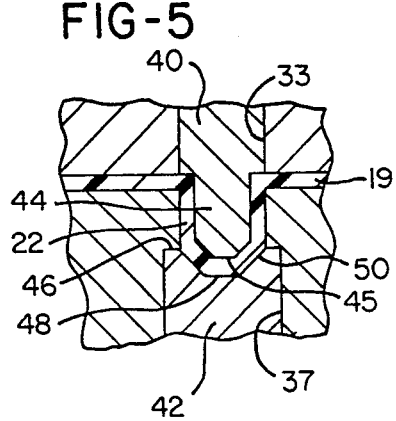
FIG-6

ENCODED CARTRIDGE

BACKGROUND OF THE INVENTION

This invention relates to cartridges and cassettes for retaining light sensitive material, and more particularly to such cartridges and cassettes provided with a protected key code.

Cartridges for insertion into utilization apparatus have been provided with discrete encoding portions, such as protrusions, slots and/or holes, are arranged in such a manner that an undesired or improper cartridge could not be inserted or placed into the utilization device and inadvertently used. Further, encoding information has been provided on cartridges for the purpose of identifying a characteristic of the material contained within the cartridge, which characteristic is read and interpreted or used by the utilization apparatus.

Prior devices which have been designed to prevent the inadvertent utilization of a cartridge or cassette have had the disadvantage that they are unreliable and often can be defeated. Also, the encoding arrangement did not provide a variety of codes, and did not provide a fail-safe structure in the event of attempted forced use or cheating.

SUMMARY OF THE INVENTION

This application is directed to a cartridge or cassette containing a spool of light sensitive web-type media material, for encoding the cartridge in a reliable manner. The invention is particularly adapted for cartridges which contain a donor web, in which the web contains microencapsulated image-forming chromogenic material, such as made in accordance with the teachings of U.S. Pat. Nos. 4,440,846 and 4,399,209, assigned to the same assignee as this invention. However, the concepts of this invention may advantageously be used with cartridges containing other types of media material.

The invention utilizes a binary code to achieve a plurality of possible configurations, using a discrete number of binary encoding positions, such as four. In the preferred embodiment, each position is represented by a recess, or by a protrusion in the shape of a pin. In the case of the recess, a recessed portion of a wall of the cartridge forms a hole and is preferably formed during the injection molding of one of the cartridge end caps. The recess may be formed by a suitable outward selection of core pins in the mold.

In the case of the protrusion, it is formed as an extension of a wall of the end caps of the cartridge, by molding a wall of the cartridge about a core pin. A cylindrical protrusion is thus formed, which may also be described as a pin, and is hollow and closed at its outer end. If someone attempts to utilize the cartridge incorrectly, and breaks off one of the pins in such an attempt, that person would run the risk of allowing light to enter into the cartridge assembly, thus damaging the lightsensitive media material.

The protrusions and recesses or holes form a binary code, which may be readily and easily read by the utilization apparatus. In the preferred embodiment, four binary positions are shown which provide the possibility for a large number of combinations. Sixteen such positions are illustrated in this application in which each of the pins is provided with the same length, and each hole or pin is in the binary location. However, the combination of holes and pins may be substantially increased by varying the length or eccentricity of a pin, or varying the depth or eccentricity of a hole. When the eccentricity is considered, the number of possible positions is limited only by the number of angular offsets of the pin and/or hole which may be reliably be read or interpreted by the utilization equipment. Similarly, the adjustment of the length and/or depth of a pin or hole as the case may be, may be employed to provide still further combinations.

A particular advantage of the concept of this invention permits the selection of codes which provides compatibility in one direction and not in another. Thus, the code or combination encoded in a new cartridge may be designed so as to permit utilization in an older machine, whereas a cartridge designed exclusively for the older machine could not be utilized in the newer machine. Thus, rearward compatibility may be assured without sacrificing forward incompatibility.

The combination of holes or pins may be readily selectable in the molding operation for the cartridge end wall by suitably selecting a combination of core pins of the mold which create, in the finished item, either a recess or a pin. Thus, the cartridge can be keyed for specific applications by selecting suitable mold parts. A mold operator can change pin configurations to suit a variety of machines, each requiring different coded information. Preferably, the codes are incorporated in only one end cap mold, in the preferred embodiment, thus reducing mold cost and part cost.

It is accordingly an object of this invention to provide a binary code in the form of protrusions and/or recesses for identifying a characteristic of the material or providing for insertion only into particular utilization apparatus.

A further object of the invention is the provision of a series of protrusions and holes, in combination with a cartridge of light-sensitive media material.

Another object of the invention is the provision of a cartridge key code for a cartridge or cassette, and a cartridge utilizing such code, consisting of an arrangement of pins or protrusions or recesses.

A further object of the invention is the provision of a low-cost and effective versatile code for cartridges of light sensitive media material which permits the molding in a low-cost mold, and in which core pins may be conveniently selected to create a plurality of patterns of holes and protrusions.

A still further object of the invention is the provision of an encoding system for cartridges, cassettes and the like, as outlined above, providing one way compatibility.

These and other objects and advantages of the invention will be apparent from the following description, the accompanying drawings, and the appended claims.

BRIEF DESCRIPTION OF DRAWINGS

FIG. 4 is a fragmentary section through a pair of mating mold halves for an end cap showing the arrangements of core pins to form a recess;

FIG. 5 is a fragmentary section through the mold halves of FIG. 2, showing the arrangement of core pins for creating a pin or protrusion; and FIG. 6 is a chart of available coded configurations using four coding elements, either a pin or a recess.

DESCRIPTION OF PREFERRED EMBODIMENT

Figure 1:
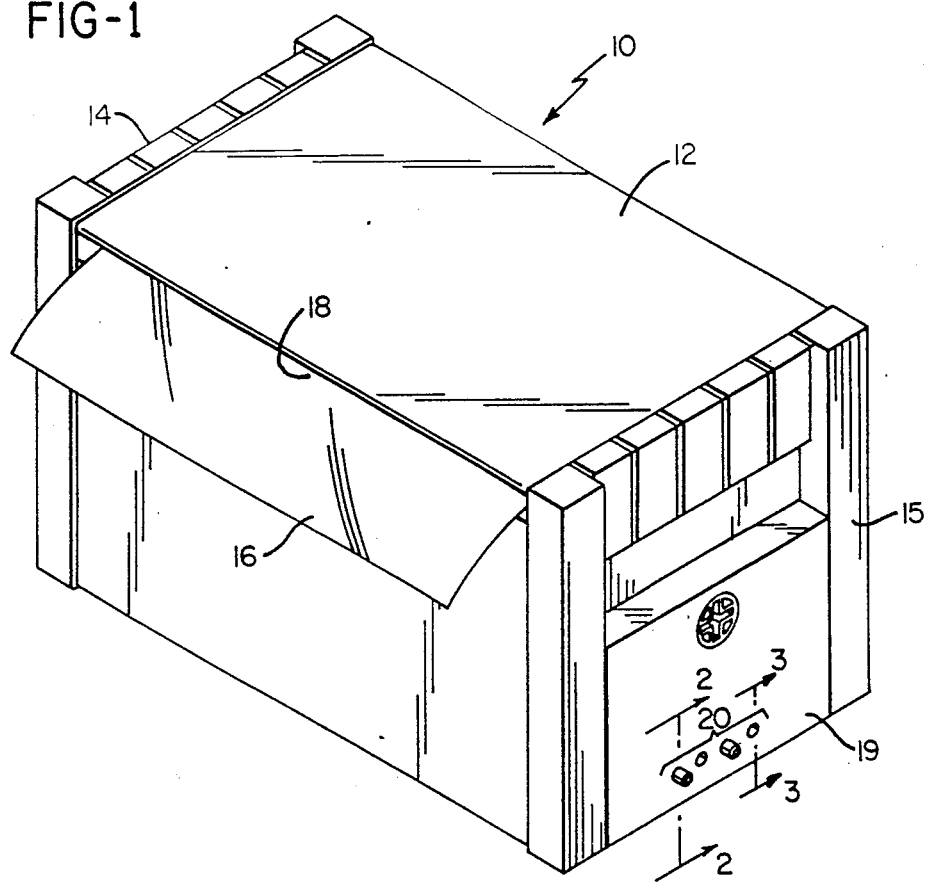
FIG. 1 is a perspective view of a cartridge according to this invention.

As used herein, the term "cartridge" is intended to include both single and multiple spool media containers, the latter often being referred to as a cassette. As illustrated in FIG. 1, the cartridge 10 includes a central housing 12 which is sometimes referred to as a housing board, and a pair of injection cartridge ends or caps 14 and 15. The end caps 14 and 15 are fitted to the opposite ends of the housing 12 and close the housing 12. It will be understood that a spool, not shown, is received in the housing 12 between the end caps 14 and 15 and contains a web-type media material 16 which exits the housing 12 through a slot 18.

In accordance with this invention, an outer wall 19, one or both of the end caps 14 and/or 15 is provided with a plurality of binary encoded positions indicated generally at 20. The encoded positions consists of either a pin 22 or a recess 24 formed as an integral part of the outer wall 19. As shown in FIGS. 1 and 6, four binary positions consisting of either pins or recesses provide sixteen codes, shown as codes 0 through 15 in FIG. 6. However, as previously noted, the number of available codes may be substantially increased by varying the eccentricity of either a pin or a recess, or by varying the length of the pin, the depth of the recess, or both.

The individual code positions 20 are formed during the injection molding of one of the end caps, such as the end cap 15 of FIG. 1. FIGS. 4 and 5 illustrate the method and apparatus by which the code positions, either in the form of the protrusion or pin 22, or the recess 24, is formed integrally in the plastic wall 19 of the end cap 15. In Fig. 4, the opposing core halves 25 and 26, which are spaced apart to define the thickness of the wall 19, are provided with suitable core pins, depending upon whether a protrusion or pin, or a recess, is to be formed at any given code position 20. In FIG. 4, the core pins are so configured as to form a recess 24, and include a first removable core pin 30 in the mold half 25, and a mating and cooperating removable core pin 32 in the mold half 26. Core pin 30 is received in a straight recess 33 and is formed with a flat end 35 which forms one inside surface of the recess 24. On the other hand, the core pin 32 is received in a stepped recess 37, the smaller diameter of which is identical to that of the recess 33. The end of the pin 32 is shouldered or stepped as indicated at 38 and has a flattened nose portion 39 to form the inner wall surfaces of the recess 24.

FIG. 5 illustrates the manner in which the core pins 30 and 32 are extracted and core pins 40 and 42 are inserted, respectively in the mold openings 33 and 37, previously described in connection with FIG. 4. It will be understood that opposed pairs of the pin-receiving recesses 33 and 37 are formed in the respective mold halves 25 and 26 at each of the four code positions 20. The core pin pairs either 30, 32 to form a recess 24 or core pins 40, 42, to form a protrusion 22, are selected by the mold set-up person, to create any particular code, such as the codes 0 through 15 as diagrammed in FIG. 6.

Figure 2:
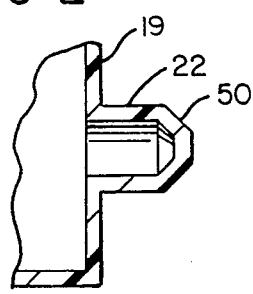
FIG. 2 is a section through a pin taken along line 2—2 of FIG. 1.

The core pin 40, over its major length, has the same diameter as that of the pin 30, but the portion thereof which extends through the mold opening 33 is shouldered and is formed with a reduced diameter portion 44 terminating in a chamfered end 45, to form the inside surface of the pin 22. On the other hand, the core pin 40 is formed at the larger diameter of the recess 30 and has an inner end which butts against the mold shoulder 46 and is provided with a complementary beveled end or recess 48 which defines with the end 45 of the pin 40 a wall space for the portion of the wall 19 which will define the closed outer end of the pin 22, as illustrated in FIG. 2. While the protrusion or pin 22 could be formed as a cylinder, with right-angled corners, it is preferred to form the pin with chamfered corners 50, as illustrated, to facilitate insertion into the utilization apparatus.

It will be seen that the pin 22, which is formed by the space between the core pins 40, 42 is hollow. Any attempt to tamper, such as by breaking off the pin in order to insert the cartridge in improper utilization apparatus, runs the risk of impairing the integrity of the cartridge, by admitting light through the broken or sheared off pin into the cartridge interior.

As previously noted, the reduced diameter end portion 44 of the pin 40, and the cooperating recess formed in the pin 42, may be formed with varying lengths, to produce pins 20 of corresponding lengths. Similarly, the pins 30 and 32 making up a recess may be varied in corresponding length and depth to form a recess of differing depths.

Figure 3:
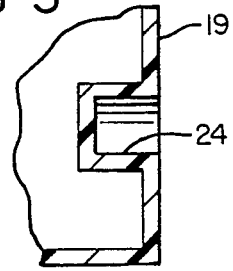
FIG. 3 is a section through a recess taken along line 3—3 of FIG. 1.

The operation of the invention is largely self-evident from the foregoing description. A cartridge end cap code is set up, during the injection molding, for a specific application. A mold operator can change the pin configuration, by suitably substituting combinations of the pin pairs 30, 32, and 40, 42 to suit a variety of machines, each requiring different code information. As shown in Fig. 3, sixteen codes are possible by the simple use of a binary code consisting of a recess or a pin in four positions. Additional encoding positions may be employed if further combinations are required, and/or the depth of the hole or the height of the pin may be varied if it is desirable to expand the number of possible combinations, as defined above.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. In a cartridge for containing light sensitive web type medial material for application to utilization apparatus and having a molded plastic body portion in which the body portion forms a cavity for containing such light sensitive material and provides light excluding integrity to said cartridge, the improvement in cartridge encoding comprising:
    means on said cartridge body portion forming a plurality of binary encoding positions, wherein in each said position there is either a recess or a protrusion formed integrally with the body portion, and in which each said protrusion is hollow and is formed by an enclosing wall and a closed outer end and defining therein a hollow interior communicating directly with said body cavity such that the breaking off of a protrusion impairs the light excluding integrity of said cartridge.

* * * * *